W. H. PAYNE & N. M. RICE.
CRUDE OIL BURNER.
APPLICATION FILED JUNE 18, 1907.
944,633.
Patented Dec. 28, 1909.
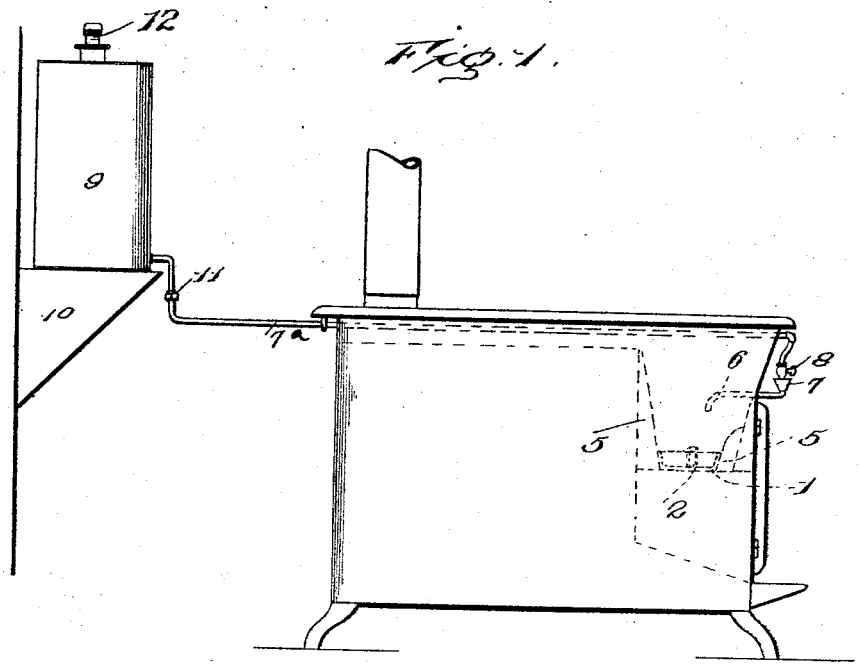
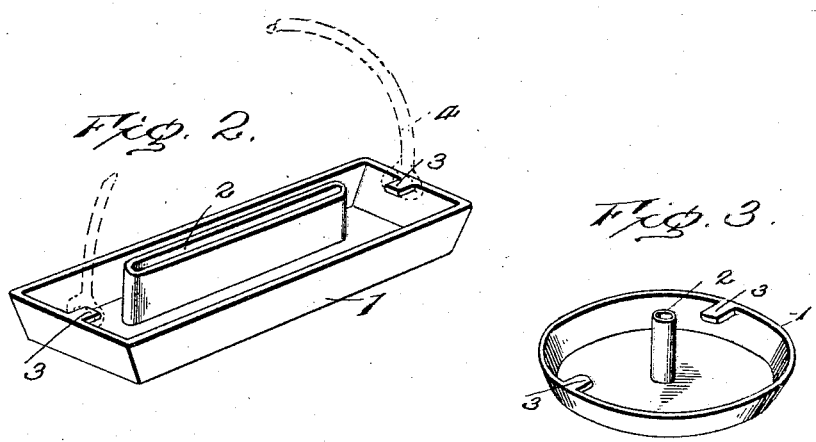
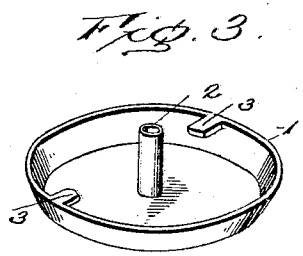

UNITED STATES PATENT OFFICE.

WILLIAM H. PAYNE AND NEWTON M. RICE, OF DALHART, TEXAS.

CRUDE-OIL BURNER.

944,633.  Specification of Letters Patent.  Patented Dec. 28, 1909.

Application filed June 18, 1907. Serial No. 379,624.

*To all whom it may concern:*

Be it known that we, WILLIAM H. PAYNE and NEWTON M. RICE, citizens of the United States, residing at Dalhart, in the county of Dallam and State of Texas, have invented certain new and useful Improvements in Crude-Oil Burners, of which the following is a specification.

This invention provides novel means for utilizing crude petroleum as fuel for cooking and heating stoves, the means being of such formation as to enable their ready adaptation to stoves already in use.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a detail view showing the application of the invention to a cook stove. Fig. 2 is a detail perspective view of the burner. Fig. 3 is a perspective view of a modified form of burner designed for heating stoves.

Corresponding and like parts are referred to in the following description and indicated in all the views of the drawings by the same reference characters.

The burner proper comprises a pan 1 which is shallow and of an outline corresponding to the shape of the fire pot of the stove or heater for which designed. As indicated in Fig. 2 the burner is of oblong formation to conform to the shape of the fire box of a cooking stove. Fig. 3 shows the burner of rounded form corresponding to the circular shape of the fire pot of a heating stove. The pan 1 has its walls upwardly sloped and is provided with a central opening 2, the wall surrounding the said opening projecting a short distance above the plane of the upper edge of the outer inclosing wall. Oppositely disposed lugs 3 projecting inward are adapted to be engaged by means of a bail 4 when it is required to place the burner in position in the fire box or to remove it from the stove or heater, said bail being removed after the burner has been placed in position. The burner is slightly smaller than the fire box or pot so as to leave a space between its walls and the lining or sides of the fire box, and this space is filled with fire clay 5 or other refractory material.

The drip pipe 6 extends through a side of the stove and is arranged to deliver the oil into the pan to one side of the opening 2. The outer end of the drip pipe is flared, as shown at 7, to catch the oil and insure its delivery from the supply pipe into the receiving end of the drip pipe. The supply pipe $7^a$ is of small bore, being usually a hollow wire and is provided with a drip cock 8, the nozzle of which is arranged above the flared end 7 of the drip pipe. The supply pipe $7^a$ is connected with a tank 9 which is located upon a shelf 10 at a safe distance from the stove or heater. A union 11 in the length of the supply pipe admits of the parts being separated should it be required to remove the tank 9 for any purpose.

An air valve 12 is fitted to the upper portion of the tank so that a pump or other air compressing device may be fitted to the tank to charge the same with air under pressure to insure a positive feed of the oil which is essential in cold weather when the oil thickens by reason of its being chilled.

A stove or heater equipped with a burner embodying the invention is enabled to use crude oil as fuel. For starting the stove, the cock 8 is opened to admit of a quantity of oil being supplied to the pan, after which the same is ignited, and when the parts become thoroughly heated, the flame may be regulated so as to be free from smoke by proper adjustment of the supply of oil which is adapted to be regulated by means of the cock 8. The air for supporting the combustion enters the burner through the central opening 2, the size of which is determined at the outset to insure a nearly perfect combustion of the fuel.

Having thus described the invention, what is claimed as new is:

The herein described oil burner comprising a shallow pan adapted to be arranged within the fire box of an ordinary stove, the walls of the pan being flared outwardly and provided at their upper edges with inwardly projecting lugs lying in the same horizontal plane as the upper or rim edge of the pan, the pan being provided in its bottom with an opening extending therethrough, an annular wall surrounding said opening and projecting upwardly beyond the above mentioned flared outer wall, and a bail detachably engaging the lugs for placing the pan in position within the stove.

In testimony whereof we affix our signatures in presence of two witnesses.

WILLIAM H. PAYNE. [L. S.]
NEWTON M. RICE. [L. S.]

Witnesses:
REESE TATUM,
D. B. HILL.